INVENTOR.
CHARLES H. SHAW
ROBERT G. STRAUSS
BY

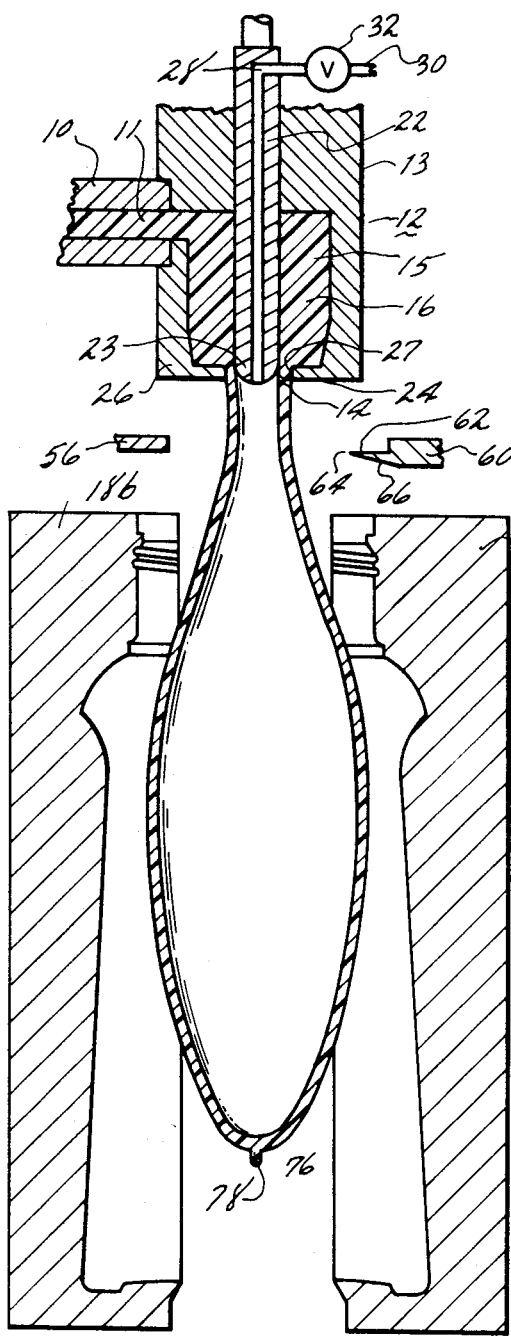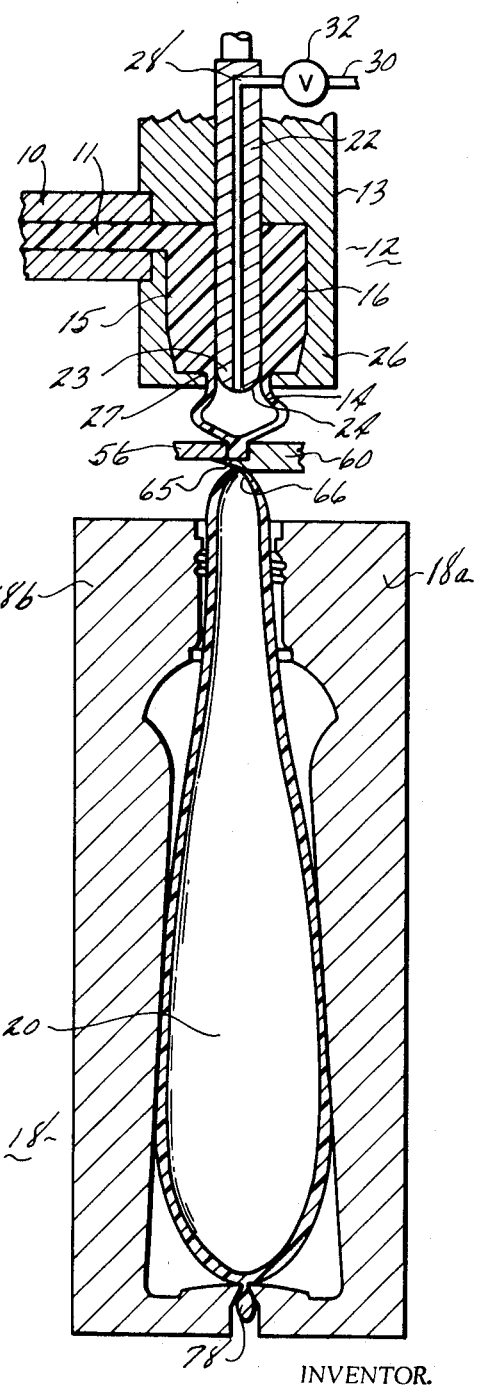

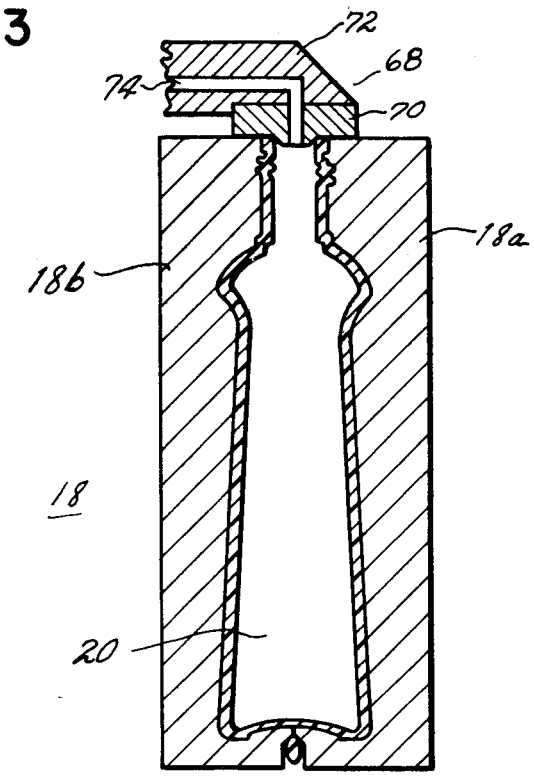
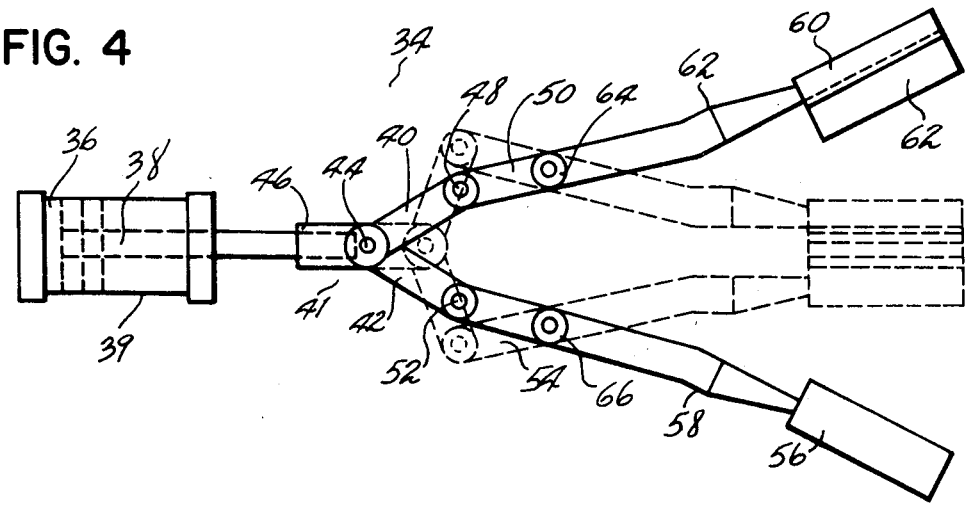

ATTORNEY:

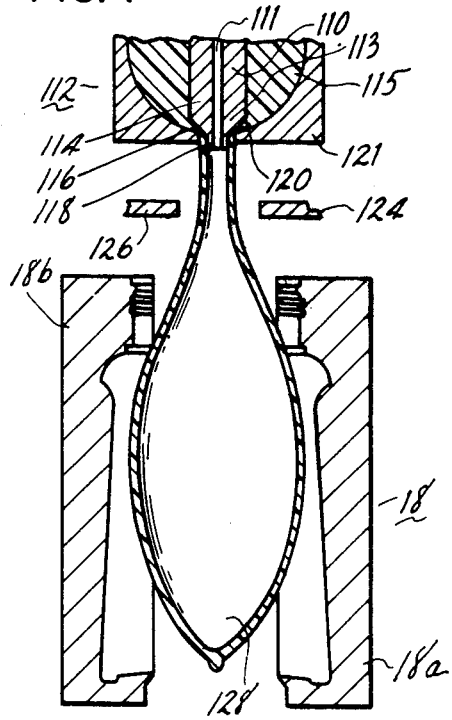
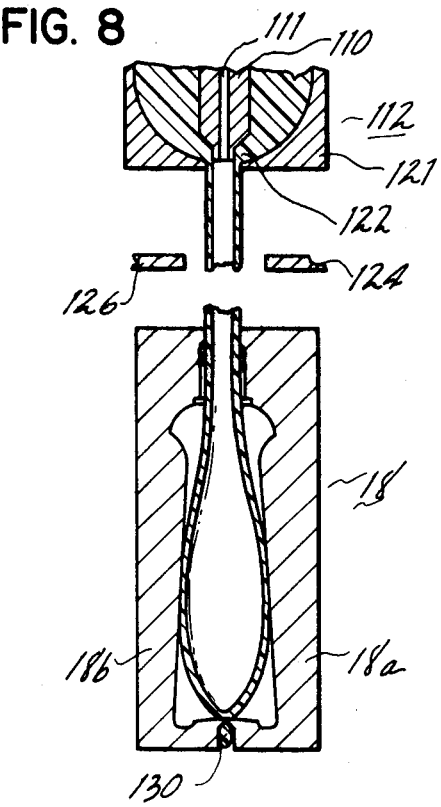
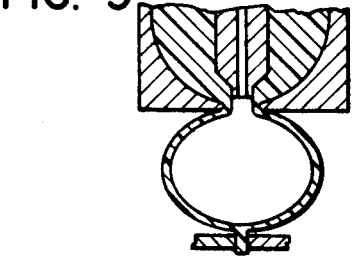
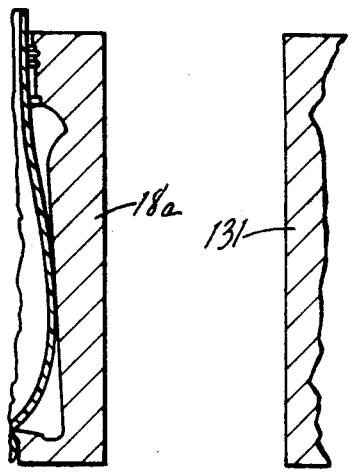

United States Patent Office 3,579,622
Patented May 18, 1971

3,579,622
METHOD FOR BLOW MOLDING PLASTIC ARTICLES
Charles H. Shaw, Bloomfield, and Robert G. Strauss, West Hartford, Conn., assignors to Monsanto Company, St. Louis, Mo.
Original application Oct. 17, 1966, Ser. No. 587,255, now Patent No. 3,509,596, dated May 5, 1970. Divided and this application Apr. 10, 1969, Ser. No. 839,746
Int. Cl. B29c 17/07
U.S. Cl. 264—99                              1 Claim

ABSTRACT OF THE DISCLOSURE

A method of blow molding a hollow article wherein the parison is preblown and then allowed to partially deflate and shrink in size to obtain the benefit of stretching during pre-inflation while avoiding chill marks in the finished article.

---

This is a division of copending application Ser. No. 587,255, filed Oct. 17, 1966. now U.S. Pat. No. 3,509,596, issued May 5, 1970.

This invention relates to improvements in an apparatus and process for forming plastic articles, and more particularly to an improved method for blow molding plastic articles.

In blow molding articles, for example bottles, by expanding a heated tube or parison of thermoplastic material against the walls of a hollow mold, chilling and setting of the plastic occurs almost instantaneously on contact of the plastic with the walls of the mold cavity. When this setting of the plastic occurs, no further expansion is possible, so that the parts of the body of the bottle first contacting the mold walls are generally of greater wall thickness than those parts formed by later contact with the walls. It has been particularly difficult in the past, therefore, to blow mold non-cylindrical or irregularly shaped bottles with a uniform wall thickness wherein certain sections of the parison must be expanded further than other portions which may have already contacted the mold walls. Uneven wall thickness results in poor impact strength causing the bottles to break or buckle in the thinner sections when top loaded, e.g., when stacked.

The difficulty has been especially pronounced in blow molding the more recently developed handleware bottles wherein a hand hole radially offset from the axis of the bottle is provided by expanding the parison around cooperating protrusions extending from the walls of each mold half. These cooperating protrusions matingly contact when the mold is closed and represent the mold configuration which yields the hand hole in the finished article. To produce such a bottle it has been necessary to position the parison asymetrically within the closed mold so that the part of the parison which ultimately forms the body of the bottle adjacent the hand hole is located quite close to the corresponding wall of the mold cavity, while that part which will form the opposite side is located considerably further away from its confining cavity wall and must be expanded over a greater distance. On expansion, non-uniform wall thickness results, with the amount of plastic material in the area of the hollow handle and adjacent wall being greater than that in the diametrically opposite wall due to the difference in the amount of expansion which each side of the parison has undergone. To overcome this variability, extremely large diameter parisons requiring minimum expansion have been used, but this approach results in excessive waste in the tail pinch area, is uneconomical, unnecessarily increases the weight of the plastic in the container, and requires larger extrusion tooling (i.e., mandrels, dies) to produce the larger diameter parison.

Accordingly it is the principle object of the present invention to provide a method for producing hollow plastic articles having non-cylindrical cross sections with improved wall thickness distribution.

It is a particular object of this invention to provide a method for economically forming hollow plastic articles having non-cylindrical cross sections with improved wall thickness distribution while avoiding excessive plastic consumption in formation of the article.

It is a further object of the present invention to provide a method for forming hollow articles of non-cylindrical cross section by modifying the shape of a normally tubular blank from which the article is formed, to a configuration more nearly conforming to that of the finished article.

It is a further object of this invention to provide a process for forming hollow plastic articles having non-cylindrical cross sections wherein the amount of tail pinch is reduced.

It is an additional object of this invention to provide a process for forming hollow plastic handle type bottles.

It is a further object of this invention to provide a process for forming hollow plastic articles which allows the use of smaller extrusion tooling.

It is a still further object of the present invention to provide a method to carry out the above objects.

Other objects of this invention will in part be obvious and will in part appear hereinafter.

These and other objects are accomplished by providing a method for forming hollow plastic articles having neck and body portions, comprising the steps of extruding moldable plastic material from a supply source downwardly through an outlet orifice to form a generally tubular length of the material, clamping the tubular length below the outlet orifice to form a seal across the tubular length, injecting gas into the portion of the length above the seal to partially expand said portion, enclosing the partially expanded shape within a partible mold having adjacent neck and body forming cavities, and further expanding the partially expanded shape to form the hollow article.

In describing the overall invention, reference will be made to preferred embodiments illustrated in the accompanying drawings, in which:

FIG. 1 is a partial, schematic, vertical, sectional view illustrating the preferred apparatus embodiment at an early stage in the present inventive process with the pre-inflation gas on;

FIG. 2 is a partial, schematic, vertical, sectional view illustrating the parison cutting and sealing step of the process;

FIG. 3 is a schematic vertical sectional view illustrating the expanded parison and blowhead assembly;

FIG. 4 is a plan view illustrating the complete parison cutting and sealing assembly;

FIG. 7 is a partial, schematic, vertical, sectional view illustrating a modified form of the present invention from that depicted in FIGS. 1 and 2;

FIG. 8 is a partial, schematic, vertical, sectional view illustrating the cut parison of the modified form of the present invention depicted in FIG. 7;

FIG. 9 is a partial, schematic, vertical, sectional view illustrating the parison sealing step of the modified form of the invention depicted in FIG. 7.

Figure 5:
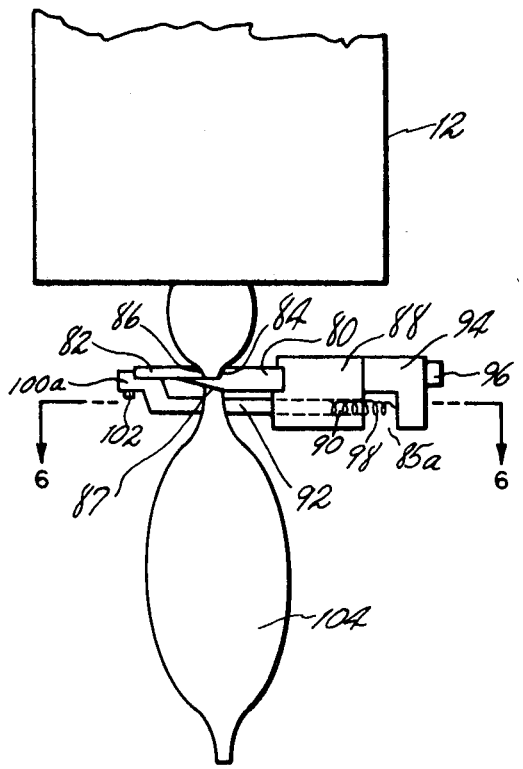
FIG. 5 is a side, elevational view of an alternate embodiment of the present invention illustrating parison gripping apparatus.

With reference to the drawings wherein identical numerals refer to identical parts, there is shown in FIG. 1 a generally vertical extrusion head 12 having one side attached to an end of horizontal conduit 10, which in turn may have its other end connected to the discharge of a conventional worm extruder, not shown. Extrusion head 12 has a cylindrical exterior wall 13, and a generally cylindrical vertically extending reservoir 15 communicating with opening 11 in horizontal conduit 10. Cylindrical inner core or mandrel 22 is mounted within reservoir 15 so as to define an annular cavity. At the lower end of the illustrated inner core 22, there is mounted an extrusion tip 23 which provides an inner surface of a parison defining outlet through which a heated and suitably homogenized organic plastic resin such as, for example, polyethylene is extruded in generally tubular form. Extrusion ring 26 is provided at the lower end of the extrusion head 12 having curved shoulder 27 which cooperates with generally convex downward surface 24 of extrusion tip 23 so as to define an annular outlet orifice 14 in axial alignment with tip 23. Inner core 22 is bored to provide passageway 28 therein. Gas pressure supply conduit 30 has its opposite ends connected with passageway 28 and with a suitable low pressure gas supply source (not shown). The communication may be continually maintained or gas pressure supplied at timed intervals as by means of control valve 32 mounted in line 30 between passageway 28 and the gas supply source.

Multi-section mold 18 having mold sections 18a and 18b is provided to form a cavity generally designated 20 in which to blow mold and shape an article. Extrusion head 12 is so disposed that mold 18 may be brought into registry therewith.

In the illustrated embodiments, mold sections 18a and 18b are preferably mounted on a conventional rotary turret table not shown which preferably carries a plurality of equally spaced molds not shown, identical with mold 18. As is hereinafter described in greater detail, operation of mold 18 may be automatically controlled in time sequence with the operation of extrusion head 12 and other components of the apparatus by suitable timing mechanisms not shown.

Referring now to the parison cutting and sealing apparatus which is a special feature of the present invention as illustrated in FIG. 4, there is provided a piston operated scissors like assembly 34. Piston 36 is connected to rod 38 within housing 39. Toggle joint 41 comprises cutter pivot member 40 and sealer pivot member 42, and rod extension 46, all three being pivotably mounted together on toggle pin 44, with rod extension 46 rigidly joined to rod 38.

Pivot member 40 has one end pivotably connected at 48 to cutter blade support member 50. Sealer pivot member 42 is likewise pivotably connected at one end at 52 to sealer blade support member 54. Sealer blade 56 is joined, for example, by conventional bolting to sealer blade support member 54 at 58. Cutter blade 60 is likewise conventionally bolted at 62 to cutter blade support member 50. Adjustable cutter blade eccentric bushing 64 is provided to permit varying the amount of travel of the cutter blade in relation to the sealer blade. That is, the amount of open space between blades 56 and 60 may be varied from that shown in FIG. 5 by means of adjustable eccentric bushing 64. This adjustment is desirable to compensate for the varying parison wall thicknesses and diameters encountered. Sealer blade bushing 66 is mounted in sealer blade support member 54 and may also be an adjustable eccentric, though ordinarily only one is required per assembly. Mounting of the adjustable eccentric may be either on the cutter or sealer blade assembly. Bushings 64 and 66 also represent the pivot points about which the cutter and sealer support members rotate when piston 36 is activated. Though desirable, the adjustable eccentric feature of the bushing may be eliminated and any means provided to permit pivoting support members 50 and 54; a bearing or pivot pin for example may be utilized. Likewise the pivot means may be mounted in the blades and the support members eliminated if desired.

In FIGS. 1 and 2 are shown schematically the cooperative relationship between sealer blade 56 and cutter blade 60. Cutter blade 60 has step 62 extending along its length, with cutting edge 64 extending along the outer end of the horizontal portion of step 62. Tapered surface 66 recedes downwardly and inwardly from edge 64. The thickness of sealer blade 56 should generally be equivalent to the height of the vertical portion of step 62. Both cutter blade 60 and sealer blade 56 must be laterally alignable to permit sealer blade 56 to fit within step 62 to provide cutting line 65 when the blades are in the closed position depicted in FIG. 2. The location of the step and the tapered surface may be reversed however, with the step situated below the tapered surface and the sealer blade accordingly mounted laterally opposite it.

Blow assembly 68 is shown in FIG. 3, which comprises blow head 70 and blow head assembly arm 72. Channel 74 is provided in blow assembly 68 and is connected to a pressurized gas supply source, not shown.

The sequence of operations of this embodiment of the invention is typically as follows: As shown in FIG. 1, hot thermoplastic material issuing from reservoir 15 of extrusion head 12 is extruded through annular outlet orifice 14 to begin to form a generally tubular length of the material. Mold halves 18a and 18b are in the open position in registry with extrusion head 12. Cutter and sealer blades 56 and 60 are likewise in open position, after having previously cooperatively closed to sever the previous unit and seal the open end of the next succeeding parison, the sealed end shown at 78 in FIG. 1. During extrusion of the parison, and preferably after ½ to ⅔ of the length of the parison necessary to form an article has been extruded, control valve 32 is opened to permit introduction of low pressure, puff gas through passageway 28 in inner core 22 into the tubular length being formed, to partially expand the tubular length into bulb-like shape 76. After formation of partially expanded bulb-like shape 76, mold halves 18a and 18b are closed around it as shown in FIG. 2, with tail 78, which was formed when the previously extruded bulb-like shape was cut and sealed, being pinched in the usual manner at the bottom between cooperating edges of the mold halves. Simultaneous with the closing of the mold halves or immediately thereafter, the cutter and sealer blades are closed and extrusion head 12 is removed from alignment with mold 18 with blow head assembly 68 then brought into alignment therewith closing of the cutter and sealer blades is accomplished when piston 36, piston rod 38 and rod extention 46 of scissors like assembly 34, shown in FIG. 4, are moved to the right under the influence of a suitably supplied conventional pressurized fluid so that rod extension 46 is in the position shown in outline form in FIG. 4. As rod 38 moves to the right, members 40 and 42 pivot about toggle pin 44 at one end and about pivot points 48 and 52 at their other ends, with the latter ends moving outwardly, while support members 50 and 54 pivotally connected to members 40 and 42 at 48 and 52, also pivot about bushings 64 and 66 as a result of this movement of rod 38. The ends of support members 50 and 54 at 58 and 62 thereby move inwardly to cooperatively move cutter blade 60 and sealing blade 56 into closed position as shown in FIG. 2, and in phantom outline in FIG. 4, thereby simultaneously severing the partially expanded bulb-like shape and sealing the bottom end of the next succeeding one. After remaining in the closed position momentarily, the direction of movement of the piston 36 is reversed by conventional manipulation of the pressurized fluid flows, and the blades return to the position depicted in FIG. 4 as another extrusion cycle commences.

Further expansion or blow molding of the partially expanded bulb-like shape into the finished article is performed after the mold is removed or as it is being removed from alignment with extrusion head 12, by directing pressurized fluid through channel 74 of blowhead assembly 68 as illustrated schematically in FIG. 3. After the article is formed, the mold may be opened after which the formed article may be removed or blown from the apparatus in the usual manner, and the waste tail at the bottom and sprue at the top of the article trimmed off by conventional means.

As can be appreciated from FIG. 2 the top of partially expanded bulb-like shape 76 is kept open during the severing operation due to the influence of tapered surface 66 of cutter blade 60. Maintaining the top of the enclosed bulb-like shape open permits escape of pre-inflation air and keeps the end of the bulb-like shape in a belled out position to permit the end of the blowhead assembly to enter.

Figure 6:
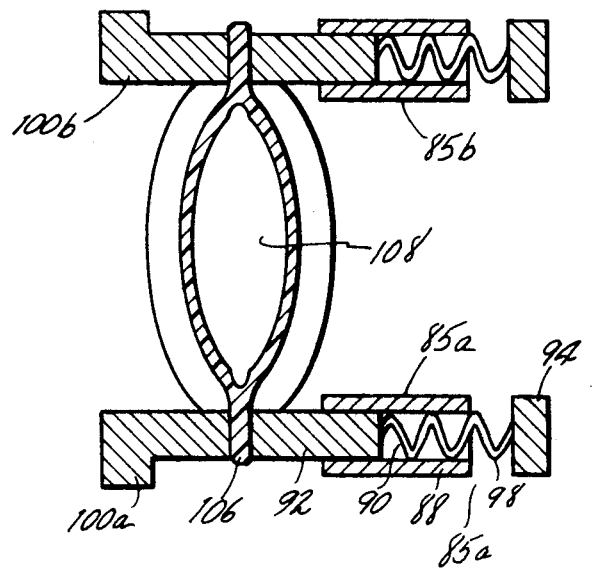
FIG. 6 is a plan view taken along the line 6—6 of FIG. 5.

In FIGS. 5 and 6 is schematically depicted an alternate embodiment of the cutting and sealing apparatus of the present invention which features parison gripping provisions. Cutter blade 80 and sealer blade 82 are constructed similarly to those previously described except that each here has an upwardly and outwardly tapering sealing surface depicted respectively at 84 and 86.

Cutter blade 80 is provided with 2 identical gripping assemblies 85a and 85b, as shown in FIGS. 5 and 6, only one of which will here be described in detail. Gripping assembly 85a comprises sleeve or channel member 88 which is joined to cutter blade 80. Channel member 88 has channel 90 therein, within which movable jaw 92 may move horizontially back and forth. Stop member 94 is connected to channel member 88 by conventional means, for example by bolt 96. Biasing means are provided by compression spring 98 which is connected at one end to stop member 94 and at the other end to movable jaw 92 and is under compression when the cutter and sealer blades are in open position so as to urge movable jaw 92 away from stop member 94. Sealer blade 82 has fixed jaws 100a and 100b attached thereto by conventional means, for example, by bolt 102. Conventional means (now shown) must be provided for limiting the maximum outward movement away from stop member 94 of jaw 92 in channel member 88. For example, a slot may be bored in jaw 92 in which rides a pin rigidly connected to channel member 88. The pin and slot arrangement would prevent spring 98 from urging jaw 92 completely out of channel 90 when the blades are in open position. Cutter and sealer blades 80 and 82, gripping assemblies 85a and 85b and fixed jaws 100a and 100b are toggle mounted and fluid operated in a manner identical with that previously described and depicted in FIG. 4.

When the process is operated with the apparatus depicted in FIGS. 5 and 6, after partially expanded bulb-like shape 104 has been inflated, cutter blade 80 and sealer blade 82 cooperatively close to sever bulb-like shape 104 and seal the end of the subsequent blank as depicted in FIG. 5. On closing, movable jaw 92 abuts against fixed jaw 100a and in so doing squeezes, flattens, and grips a portion of the bulb-like shape as shown typically at 106 in FIG. 6. The top 108 of bulb-like shape 104 remains open, however, because of the influence of downwardly tapering cutting surface 87 of cutter blade 80. While the bulb-like shape is gripped and supported in two places between gripping assemblies 85a and 85b and jaws 100a and 100b, and with top 108 open to the atmosphere, some pre-inflation air escapes and the partially expanded bulb-like shape relaxes and flattens out somewhat, before the mold halves are closed about it. After closing of the mold, the blowhead assembly is conventionally moved into alignment therewith and the relaxed, stretched bulb-like shape further expanded to the final article configuration. The mold halves are then opened and the article removed, and the tail at the bottom and sprue at the top of the article as well as the flash material formed by the squeezing action of the jaws at the upper end of the partially expanded bulb-like shape are trimmed off by conventional means. The upward and outward taper of sealing surfaces 84 and 86 facilitate removal of the sealed end of the subsequent bulb-like shape from that being cut when extrusion head 12 is vertically lifted, for example, away from the area where the seal was formed.

In this embodiment, when cutter blade 80 and sealer blade 82 are in closed position without squeezed plastic therebetween, movable jaws typically shown at 92 and fixed jaws 100a and 100b are initially set by means of an eccentric bushing previously described and shown at 64 in FIG. 5, so that their opposing end faces are in touching contact. The horizontal movement of the movable jaws permitted by means of springs 98, thereafter permits griping different thicknesses of plastic between the fixed and movable jaws without need for adjusting the travel of blades 80 and 82 on each occasion.

Use of the gripping provisions of FIGS. 5 and 6 also permit supporting the bulb-like shape while it is being transported to a waiting mold, or while the mold halves move in on it as it hangs below the extrusion head. It should be understood that the movable gripping jaws depicted in this form of the invention, may, if desired, alternatively be mounted on the sealer blade with the rigid jaws mounted on the cutter blade. Ordinarily it makes no difference on which blade the movable jaws are mounted.

FIGS. 7, 8 and 9 illustrate still another modification of the technique for cutting and sealing a pre-inflated parison as herebefore described. In this embodiment cutting and sealing are performed by separate means, rather than by the same apparatus as depicted in FIGS. 1 and 2. Extrusion tip 113 of cylindrical inner core 110 of extrusion head 112 has a frusto-conical tapered portion 114 near its lower end, having an outer surface 116. Cylindrical end portion 118 of extrusion tip 113 is connected to tapered portion 114 at the lowermost extremity of tapered portion 114, and cooperates with shoulder 120 of extrusion ring 121 to define annular extrusion outlet orifice 122 in extrusion head 112, when inner core 116 is in an upper extruding position as depicted in FIG. 8. Reservoir 115 is provided within extrusion head 112. Inner core 110 has channel 111 which may be connected to a pressurized gas source (not shown) as mentioned previously. In this embodiment, the cutter blade depicted previously is eliminated and replaced by a second sealer blade identical in construction to that previously described. Therefore, primary and secondary sealer blades 124 and 126 are provided with activating means identical to that portrayed in FIG. 4.

In the operation of this alternate embodiment, the parison is expanded into partially expanded bulb-like shape 128 by low pressure gas entering through channel 111 as previously mentioned while mold halves 18a and 18b are in open position surrounding bulb-like shape 128, sealer blades 124 and 126 are in spaced apart, open relationship and inner core 116 is in its upper extruding position, which position is depicted in FIG. 8. As previously stated, pre-inflation commences when about ½ to ⅔ of the length of parison necessary for formation of the article has been extruded. After partially expanded bulb-like shape 128 has been formed, the flow of pressurized gas is interrupted by closing a suitable valve in the pressurized gas supply line to channel 111 (not shown but similar to 32 in FIG. 1) and inner core 110 is moved axially downward so that outside surface 116 of frusto-conical tapered portion 114 momentarily compresses the extruding parison against shoulder 120 of extrusion ring 121 as shown in FIG. 7, so as to score and thin out the wall of the pre-inflated parison at this upper end point. Inner core 116 is thereupon moved axially upward to its previous extruding position as depicted in FIG. 8. During this momentary compression of the upper end, there is a corresponding momentary interruption in the flow of hot thermoplastic in the flow channel of reservoir 115. Simultaneous with or incrementally in time after the scoring of the end of partially expanded bulb-like shape 128, mold halves 18a and 18b are caused to close around the bulb-like shape 128, and extrusion head 112 is lifted axially upward and away from the mold 18, while plastic continues to issue from the extrusion outlet orifice in a generally tubular form. With this movement of the extrusion head and mold, the scored end of the pre-inflated bulb-like shape is held by mold halves 18a and 18b, and sufficiently stretched by the lifting head at the point where it is scored, so that it is torn or pulled apart from the end of the subsequent blank as depicted in FIG. 8. As extrusion head 112 begins to move axially upward, cooperating sealer blades 124 and 126 close as shown in FIG. 9 to seal the bottom of the continuously extruding tube from which the next bulb-like shape will be formed, and mold 18 is moved out of vertical alignment with extrusion head 112 while another mold moves into vertical alignment therewith, the outline of which is partially shown as 131 in FIG. 9. When the bottom end is sealed, the pre-inflation gas shutoff valve is opened at the proper time during extrusion of the next parison, to commence another cycle and extrusion head 112 is lowered between the halves of the subsequent mold (131) while the next bulb-like shape is being formed.

After bulb-like shape 128 has been enclosed within the cooperating mold halves with sealed bottom portion 130 gripped at the bottom of the mold between cooperating projections, or simultaneous with the closing, a conventional blowhead assembly is moved into alignment with the mold and the bulb-like shape further expanded into the final article configuration as described previously and typically illustrated in FIG. 3.

As an alternate to the sealing of the parison end on the upward lift of the extrusion head in the embodiment of FIGS. 7–9, sealing may be accomplished on the downward stroke prior to pre-inflation, but with this procedure the hot thermoplastic has a tendency to build up on the sealer blades.

Conventional apparatus, for example, pressurized air or hydraulically operated piston means or cam drive means cooperating with an upwardly thrusting spring (not shown) may be employed to axially move inner core 110. Similar conventional piston means may be utilized to open and close the mold halves.

The above description and particularly the drawings are set forth for purposes of illustration only and are in no way to be taken in a limited sense.

As previously mentioned, this invention is directed toward a method and apparatus for forming hollow plastic articles having neck and body portions, comprising the steps of extruding moldable plastic material from a supply source downwardly through an outlet orifice to form a generally tubular length of the material, clamping the tubular length below the outlet orifice to form a seal across the tubular length, injecting gas into the portion of the length above the seal to partially expand said portion, enclosing the partially expanded shape within a partible mold having adjacent neck and body forming cavities, and further expanding the partially expanded shape to form the hollow article.

It is essential with the method and apparatus of the present invention that the parison be extruded in a downward direction whereby it may be partially expanded while suspended below the extrusion nozzle under the influence of its own weight, and without the need for separate end support.

It will be understood that the means for supplying a timed flow of gas through the passageway in the mandrel is merely illustrative and that a wide variety of alternatives may be employed to properly time and coordinate the gas thus supplied with the several operations of the plastic blowing and extruding apparatus.

It will be appreciated that although the present invention empolys movement of the extrusion nozzle and blowhead assembly for alignment of these elements with the mold, the present invention includes the converse movement within its scope, i.e., movement of the mold to align it with the extrusion nozzle and blowhead assembly.

The cutter and sealer blades and their supports mounted on a pneumatically operated toggle joint may be designed to close and open on a single stroke of the piston by providing a piston having a stroke twice the length of that previously described. In a process not requiring pre-inflation wherein the parison end need not be sealed, the sealer blade may be replaced with a cooperating cutter blade. Though pneumatic operation is preferred, other types of moving or activating mechanisms may be employed to operate the cutter and sealer blades.

Utilization of gripping jaws in conjunction with the cutter and sealer blades is particularly advantageous in the present invention since it permits escape of some of the pre-inflation gas through the open top end of the partially expanded bulb-like shape prior to enclosing it within the mold, thereby relaxing the bulb-like shape somewhat. In doing so, however, the bulb-like shape is not returned to a tubular form but remains in a thinned-out partially expanded state. Discharge of some of the pre-inflation gas from the bulb-like shape prior to blowing decreases the possibility of formation of chill marks in the finished article. These are rough areas formed on the outside surface of the pre-inflated parison when the pre-inflated parison touches the cooled walls of the mold cavity on closing the mold. The plastic in these areas sets up so as to prevent further expansion during final blowing. Though it is not essential that the pre-inflation gas be partially vented prior to final blowing, it is preferable that some of the gas be discharged.

Though the extrusion head may be stationarily mounted, it is preferred in the present invention that it be movably mounted as, for example, mounting for vertical movement as disclosed in U.S. Pat. No. 2,349,186. With this mounting method, after the pre-inflated parison is enclosed within the mold, the extrusion head is caused to bob upward a short distance while the parison and/or bulb-like shape for the next article continues to extrude out the orifice. A revolvable rotary turret table containing a plurality of molds may be provided to index the loaded mold to one side and position an adjacent open empty mold into the position occupied by the previous one. The extrusion head is then caused to bob down as the subsequent bulb-like shape is being finally formed so as to position it within the subsequent empty mold. This extrusion is continuous and is maintained at a rate approximately equal to the velocity of the extrusion head as it bobs up and down. Through extrusion head lift is the preferred method, the system could also operate by utilizing the parison jaw gripping arrangement previously described to transport a pre-inflated parison either axially or horizontally to a movable mold from a stationary extrusion head at a rate faster than the parison is being extruded.

Any plastic material capable of being blown may be utilized in the present invention. Typical materials are thermoplastics such as low or high density polyethylene, polypropylene, polymers of vinyl chloride or polystyrene. As the density and toughness of the material increases, the amount of stretch achievable increases. Unusually good results are obtained therefore with high density polyethylene which is such a typical and preferred material. Polyvinyl chloride is also of similar consistency.

The resiliency, temperature and thickness of the plastic being extruded will determine the pressure of the pre-inflation gas required in the present invention. For most materials this pressure should be maintained between about 1/8 to about 5 p.s.i. above atmospheric pressure at the end of the inner core or mandrel of the extrusion head, and the temperature of the gas between about 20° F. to about 150° F. At temperatures below about 20° F., cold spots may occur in the inner parison surface with the result that pre-inflation of the parison may be non-uniform. In the case of high density polyethylene the pressure should be between the limits of about 1/4 to about 3 p.s.i. above atmospheric pressure, and the gas temperature between about 50° F. to about 100° F., for unexpanded parison wall thicknesses between about 1/32 in. to about 1/4 in. and parison temperatures between about 380° F. to about 460° F. At pressures less than 1/8 p.s.i. no appreciable expansion is realized. At pressures greater than about 5 p.s.i. expansion is excessive and results in the undesirable, unexpandable chill or rough spots in the finished article previously mentioned. Also at such high pressures excessive flash is formed along the parting line of the mold halves and bursting may even occur. Pre-inflation pressure determines the amount of radical expansion of the parison to be attained and may be varied with the material being extruded and the extrusion temperature to control the size of the bulb-like shape so that it just touches or is slightly smaller in maximum width than the minimum projection within the mold, thereby eliminating or minimizing chill marks.

It should be understood that with the axially movable mandrel embodiment of the present invention, the parison may be either severed completely, or scored so that the parison wall thickness is reduced such that a minimum pull by either a moving extrusion head or mold tears the bulb-like shape from the end of the next succeeding parison. As the tapered lower portion of the mandrel wears with use due to its severing or scoring action, it may be replaced if designed to be removably connected to the bottom of the mandrel. Use of this embodiment separates the cutting and sealing functions of the blades thereby decreasing mechanical wear and optimizing the action of each.

With the process of the present invention, it should be noted that substantially no axial stretching of the parison occurs during the pre-inflation step but rather a generally radial expansion takes place. The time during which the pre-inflation air is on during extrusion also determines the degree of radial expansion. In the present invention this may vary between 10% and 100% of the time to extrude the length of parison required to form one article.

Furthermore, the complete article including the neck is molded in a single step from the pre-inflated parison. Extrusion preferably is continuous rather than intermittent. Recirculation of the extruding material during mold changes is thereby eliminated.

The principal advantage of the method and apparatus of the present invention is the production of economical light weight non-cylindrical or irregularly shaped bottles having extremely uniform body wall distribution, while utilizing the same quantity of plastic material as in forming a cylindrical body. Distribution is improved since expansion is more uniform by use of a pre-inflated parison, that is, the distance between the wall of the mold cavity and the outside surface of the bulb-like shape prior to final expansion is more constant.

With the pre-inflation or puff blow step of the present invention, the parison is expanded to a larger diameter than that which it has on issuing from the extrusion nozzle, and in so doing is thinned out uniformly. A smaller tubing may thus be extruded to provide the same weight of plastic in the finished article. The extrusion ring and tip may be reduced in size in blowing a large diameter article rather than increased as is necessary without use of the pre-inflation step. Utilization of a reduced orifice reduces the extruder discharge head pressure necessary to force the plastic through the orifice. Furthermore, a single extrusion ring and tip may be used in forming various different sized containers merely by varying the time the pre-inflation gas is kept on and the pressure thereof.

Use of a reduced diameter parison also minimizes flash formation in the tail pinch area due to its undersized character.

The surface characteristics of the extruded parison prior to pre-inflation may be varied according to the method and apparatus disclosed in copending application Ser. No. 391,920, filed Aug. 25, 1964 and now abandoned, assigned to Monsanto Company.

The scissors assembly of the present invention comprising the cutter and sealer blades or the dual sealer blades may be independently mounted between the extrusion head and mold(s) or may be connected either permanently or removably to the extrusion head itself.

The method and apparatus of the present invention is applicable in forming any article having neck and body portions, and is especially applicable to non-cylindrical irregularly shaped bodies where it is necessary to blow one side further than the other, e.g., those with oval, rectangular or oblong cross sections. It is particularly adaptable in forming handleware bottles and most especially for handleware bottles having non-cylindrical elongated cross sections.

Various other modifications and alterations will be readily suggested to persons skilled in the art. It is intended, therefore, that the foregoing be considered as exemplary only, and that the scope of the invention be ascertained from the following claim:

What is claimed is:

1. A method of forming a hollow article of moldable plastic material comprising the steps of:
   (a) extruding moldable plastic material from a supply source through an annular outlet orifice to form a generally tubular length of the material;
   (b) clamping the length axially below the outlet orifice to form a seal across the tubular length;
   (c) injecting gas into the portion of the length above the seal to partially expand said portion into a bulb-like shape;
   (d) severing the bulb-like shape from the generally tubular length at the end of the bulb-like shape closest to the outlet orifice to form an open severed end separated from the length;
   (e) advancing each of two movable jaws toward oppositely positioned stationary members with the upper end portion of the bulb-like shape interposed therebetween to grip the open, severed end of the bulb-like shape simultaneously with severing while maintaining the severed end open, thereby supporting the bulb-like shape in two flash defining areas thereof;
   (f) releasing the previously injected gas from within the bulb-like shape through said open end to cause said bulb-like shape to contract in size;
   (g) enclosing the contracted bulb-like shape within a partible mold having a cavity conforming to the shape of the article;
   (h) expanding the contracted bulb-like shape within the partible mold to form the hollow article; and
   (i) separating said flash from said formed article.

References Cited

UNITED STATES PATENTS

| | | | |
|---|---|---|---|
| 3,339,232 | 9/1967 | Battenfeld et al. | 18—5(BZ) |
| 3,362,043 | 1/1968 | Langdon et al. | 264—94X |
| 3,399,424 | 9/1968 | Sheptak | 264—94X |
| 3,425,090 | 2/1969 | Nave et al. | 264—98X |
| 3,343,210 | 9/1967 | Guignard | 264—98X |
| 3,479,421 | 11/1969 | Armbruster et al. | 264—98X |

FOREIGN PATENTS

| | | | |
|---|---|---|---|
| 1,450,395 | 7/1966 | France | 264—98 |

ROBERT F. WHITE, Primary Examiner

T. J. CARVIS, Assistant Examiner